United States Patent
Li (10) Patent No.: US 11,511,493 B2
(45) Date of Patent: Nov. 29, 2022

(54) METHOD FOR AUTOMATED QUALITY MONITORING AND CONTROL OF CEMENTITIOUS/CONCRETE 3D PRINTING/ADDITIVE MANUFACTURING

(71) Applicant: THE REGENTS OF THE UNIVERSITY OF CALIFORNIA, Oakland, CA (US)

(72) Inventor: Mo Li, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 75 days.

(21) Appl. No.: 17/097,805

(22) Filed: Nov. 13, 2020

(65) Prior Publication Data

US 2021/0146631 A1 May 20, 2021

Related U.S. Application Data

(60) Provisional application No. 62/936,047, filed on Nov. 15, 2019.

(51) Int. Cl.
*B29C 64/393* (2017.01)
*B33Y 50/02* (2015.01)
(Continued)

(52) U.S. Cl.
CPC ............ *B29C 64/393* (2017.08); *B33Y 50/02* (2014.12); *B33Y 70/10* (2020.01); *E04B 1/16* (2013.01);
(Continued)

(58) Field of Classification Search
CPC ....... B29C 64/393; B33Y 50/02; B33Y 70/10; B33Y 10/00; B33Y 30/00; E04B 1/16; C04B 2235/6026
See application file for complete search history.

(56) References Cited

FOREIGN PATENT DOCUMENTS

| CN | 104309124 A | * | 1/2015 | |
| CN | 107081899 A | * | 8/2017 | ............ B33Y 10/00 |
| WO | WO-2018136475 A1 | * | 7/2018 | ............ B22F 10/10 |

OTHER PUBLICATIONS

"Resipod—Resistivity Meter" https://web.archive.org/web/20140303224433/https://www.pcte.com.au/resipod-resistivity-meter (Year: 2014).*

* cited by examiner

*Primary Examiner* — Alexander M Weddle
(74) *Attorney, Agent, or Firm* — Nguyen Tarbet LLC

(57) ABSTRACT

The present invention enables real-time, automated monitoring and measurement of 3D printed concrete quality during an additive manufacturing process. The method continuously measures electrical impedance of the fresh concrete during the printing process, using electrodes automatically carried by the printing head at the same time as concrete printing proceeds. The real-time measured impedance, resistance, or capacitance curves as a function of printing time, printing path and printing location represent the fingerprint of the 3D printed concrete product being additively manufactured. The fingerprint contains essential information on the printing quality change with time and along the printing path, allowing the real-time detection of location and severity of imperfections. It also enables monitoring and quantifying concrete strength development during 3D printing. Furthermore, it allows closed-loop control to assure the printing quality through real-time adjustment and corrections of the printing parameters.

15 Claims, 5 Drawing Sheets
(4 of 5 Drawing Sheet(s) Filed in Color)

(51) Int. Cl.
*B33Y 70/10* (2020.01)
*E04B 1/16* (2006.01)
*B33Y 10/00* (2015.01)
(52) U.S. Cl.
CPC ....... *B33Y 10/00* (2014.12); *C04B 2235/6026* (2013.01)

METHOD FOR AUTOMATED QUALITY MONITORING AND CONTROL OF CEMENTITIOUS/CONCRETE 3D PRINTING/ADDITIVE MANUFACTURING

CROSS-REFERENCES TO RELATED APPLICATIONS

This application is a non-provisional and claims benefit of U.S. Provisional Application No. 62/936,047 filed Nov. 15, 2019, the specification(s) of which is/are incorporated herein in their entirety by reference.

BACKGROUND OF THE INVENTION

Field of the Invention

The present invention is related to construction, civil engineering, structural engineering, advanced manufacturing, additive manufacturing, robotics, concrete technology, and pottery.

In particular, the present invention features an integrated system and method for quality monitoring and control during additive manufacturing (AM; i.e., 3D printing). Specifically, the present invention features an electrical impedance-based approach for a non-destructive, automated and in situ method for quality monitoring and control during 3D printing, a layer-by-layer extrusion process, of structures and components made of concrete/cementitious materials, ceramic, or clay. The quality of printing is monitored in situ by continuously measuring the impedance change of the printing material and product with time during the printing process, through four-point probing with movable electrodes carried by the printer head, robot arms or gantry system. This generates a real-time fingerprint of the printing process, shown as the electrical response signature comprising measured impedance and capacitance curves as a function of printing time, printing path and printing location. Characteristics of the fingerprint curves provide key information on the 3D printing process and quality. In addition to real-time quality monitoring, real-time quality control can also be achieved by establishing a closed-loop control, feeding the measured electrical signal back to the controller of the printer, robotic arms or gantry system. This provides real-time and in situ adjustment of the pumping force, printing speed, material ingredients supply, or the reversal of the printing path to remove imperfections, in order to control and assure quality of the 3D printing concrete structural product.

Background Art

Concrete additive manufacturing (AM), otherwise known as concrete 3D printing, is an exponentially emerging technology in the construction industry. Different from the conventional concrete casting method with prefabricated formworks, concrete AM uses robotic arms or computer-controlled gantry cranes to deposit concrete in a layer-by-layer method to achieve versatile structural geometries. Concrete AM allows for tremendous opportunities in the construction industry, architectural design, land-based and offshore wind industry, wave energy devices, military defense, rapid deployment, and NASA space exploration. It enables rapid and automated construction of concrete structures or components with reduced costs of labors and materials, removal of cumbersome formworks, increased reliability, versatile geometries, and allows construction in harsh and less accessible environments.

There has been a lack of approach to monitor the quality of 3D printing concrete and structural components during this AM process. The 3D printing process will inevitably introduce imperfections, such as material deposition discontinuities, non-homogeneities, flaws, pores, and printing interlayers into the structural components. These imperfections will greatly affect the quality of 3D printed concrete components and their bonding with steel reinforcements, and eventually greatly affect the structural performance, safety and durability. In current practices, the best available approach is visual inspection. This method, however, is subjective, limited to surface features, and does not provide any quantitative measurements that can be used for assessing and controlling the quality of the printed products.

Currently, there is no real-time quality control and monitoring method available for the additive manufacturing of concrete-, cement-, ceramics-, or clay-based materials. Compared with visual inspection, this present invention is more accurate, quantitative rather than subjective, real-time, in situ, and offers spatial resolution of concrete quality, imperfections, and strength development at every location along the printing path. In addition, this automated process is much less labor-intensive and cheaper than visual inspection. It is also low-cost because this method does not require installation of expensive sensors; rather, it engages the material and product that are being 3D printed to behave as a sensing media and only uses highly cheap electrodes (not sensors) for injecting AC current and collecting impedance data. Therefore, this method provides both spatial-continuous and time-continuous information on the 3D printing process and quality. Furthermore, the invention allows closed-loop control: the real-time monitored electrical data can be fed into the controller system of the printing equipment (e.g., robotic arm or gantry printer) to adjust the printing speed and path, material ingredients supply and flow during in situ manufacturing for improving and controlling the quality of the 3D printed products. This unprecedented quality control and assurance method will lead to higher quality, more reliable concrete products with safer, stronger, and more durable performance and less initial costs as well as lifecycle costs.

The field of concrete 3D printing/additive manufacturing is rapidly emerging in Research & Development and industrial applications. Yet this invention is novel because currently there is no quality monitoring and control methods available for concrete 3D printing/additive manufacturing, except visual inspection that is subjective and only limited to surface features. The present invention will address the bottleneck of quality control for achieving reliable 3D printed concrete structural products with increasing confidence to meet society's safety, economical, and efficiency demands.

BRIEF SUMMARY OF THE INVENTION

It is an objective of the present invention to provide systems, methods, and electrical signatures (fingerprints) and their characteristics that allow for real-time and automated monitoring, measurement and control of 3D printed concrete quality during the AM process, as specified in the independent claims. Embodiments of the invention are given in the dependent claims. Embodiments of the present invention can be freely combined with each other if they are not mutually exclusive.

The present invention features: 1) a system of four electrodes (a four-point probing system), two of which are automatically carried by the printing head at the same time as concrete printing proceeds and two of which are located at the baseline layer of the printing path for a closed-loop four-point probing system; 2) a system of 3D printing and monitoring using the four-point probing system and in some embodiments of the present invention, a two-point probing system can be used; 3) a method of in situ electrical impedance, resistance or capacitance measurement as a function of time with movable electrodes during 3D printing using the systems described herein; 4) a method of using the systems described herein for monitoring the quality of 3D printing; 5) a method of using the systems described herein to control and adjust the quality of 3D printing; and 6) using the systems described herein, obtaining a fingerprint or electrical response signature or characteristic curve of 3D printing comprising printing quality, path and time characteristics. This unique design of closed-loop probing and real-time generation of fingerprints allow for a method of continuous monitoring that is based on continuously measuring electrical impedance change (or resistance, capacitance, phase angle) of the fresh material product additively manufactured (e.g., concrete, cement, ceramic, day) during the printing process. The real-time measured impedance, resistance and capacitance curves as a function of printing time, printing path and printing location represent an electrical response signature or the fingerprint of the 3D printed concrete product. This fingerprint contains critical and necessary information on the changes of printing quality with time and along the printing path, allowing the real-time detection of location and severity of imperfections. The fingerprint also enables monitoring and quantifying concrete strength development during printing. Furthermore, the system allows closed-loop control to assure the printing quality through real-time adjustment and corrections of the printing parameters such as pumping speed and force, material flow, and printing path.

One of the unique and inventive technical features of the present invention is the set of four electrodes uniquely located to allow a closed-loop four-point probing system integrated with the AM or 3D printing process. Two electrodes are attached to the movable printer head, and two electrodes are attached to the baseline layer of the printing path. The two electrodes attached to the printer head are automatically carried by the printing head at the same time as concrete printing proceeds. Without wishing to limit the invention to any theory or mechanism, it is believed that the closed-loop four-point probing system of the present invention advantageously provides for an electrical impedance-based method for generating electrical response signatures or fingerprints for real-time monitoring of 3D printing concrete quality, imperfections, and strength development during the AM process.

A second unique and inventive technical feature of the present invention is the integration of impedance data collection with the printing process, as two of the electrodes move along with the printing head to be at the same locations at the same time along the printing path.

A third unique and inventive technical feature of the present invention is to engage the printing material (e.g., concrete or cementitious material) to behave as a sensor or a sensing media for monitoring the quality of the material or product itself, without installing or embedding actual sensors. This approach turns the printing material (e.g., concrete or cementitious material) into a self-sensing material, and the impedance data collected from the printing material provides spatially continuous information (or resolution) as well as time-continuous information on printing quality and product strength, wherever the material is located.

A fourth unique and inventive technical feature of the present invention is to use the fingerprints generated in real-time by the systems described herein, to extract key information on the printing process and quality change as a function of printing time and path, and to timely identify occurrences and locations of printing imperfections and flaws.

A fifth unique and inventive technical feature of the present invention is the closed-loop control by feeding the measured electrical signal back to the controller of the 3D printer to provide real-time and in situ adjustment of the pumping force, printing speed, material ingredients supply, or the reverse of the printing path to remove imperfections, in order to control and assure quality of the 3D printing concrete structural product. As prior quality control systems are based on visual inspection that is subjective and only limited to surface features and/or installation of expensive sensors, none of the presently known prior references or work has the unique design of the present invention comprising a closed-loop four-point probing system using inexpensive electrodes (not sensors) integrated with an automated printing process to generate real-time, electrical signatures or fingerprints of the printed material product; none of the presently known prior references or work has the unique method of obtaining as well as interpreting the electrical signatures or fingerprints of the printed material product to provide information on printing quality and location of imperfections.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The patent application or application file contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which.

DETAILED DESCRIPTION OF THE INVENTION

Concrete 3D printing is an automated layer-by-layer deposition process. Concrete filament with proper rheology is extruded/pumped through a movable printer head automatically controlled by a 3D printer, a robotic arm or a gantry printing system. Depending on the concrete material design, rheological properties, pumping force and speed, and the printing path, interlayers (with various properties) and imperfections (with various intensities and geometries) are inevitably introduced into the structural product made of 3D printing concrete.

The present invention recognizes that concrete has a porous, heterogeneous microstructure. Under an applied electric field, the dissolved ions in pore water are mobilized to generate current. When probed through AC current, the concrete and its printing filament exhibit a highly AC frequency-dependent electrical response. This electrical response can be measured as complex impedance, which represents an equivalent circuit comprising resistors, capacities and inductors. When imperfections (e.g. flaws, pores, discontinuities, interlayers) are introduced by the 3D printing process, the measured impedance and its AC frequency dependence will change correspondingly. The time of this change informs the occurrence of the imperfections. The characteristics of the change informs the features of the imperfections.

The present invention features a method that enables the real-time, in situ quality monitoring and detection of imperfections in 3D printed concrete products. The present invention also allows the monitoring of mechanical strength development in 3D printed concrete as the printing process continues, because cement microstructure and strength development with time can be reflected as the change in impedance measurements with time at different AC frequencies.

The present invention further features a method to generate an electrical signature, a fingerprint, through the automated impedance measurement of the concrete product being additively manufactured with time. The present invention also features a method to analyze and interpret the electrical signature, the fingerprint, to generate information on the printing quality, occurrence of imperfections, and the material strength development with time.

The present invention further features an electrical impedance-based method that allows establishing a closed-loop control, feeding the measured electrical signal back to the controller of the 3D printer to provide real-time and in situ adjustment of the pumping force, printing speed, material ingredients supply, or the reverse of the printing path to remove imperfections, in order to control and assure quality of the 3D printing concrete structural product.

Following is a list of elements corresponding to a particular element referred to herein:
  100 Integrated 3D Printer
  105 Camera
  110 Controlling Terminal
  120 Impedance Analyzer
  125 Robotic Arm or Gantry Printer
  130 Material Reservoir or pump (e.g., for holding and pumping concrete/cementitious material)
  140 Printer Head
  145 First Electrode (an electrode that is operatively coupled to the printer head and moves with the printer head; e.g., a movable copper tape electrode)
  146 Current (In) Cable Operatively Coupled to First Electrode
  147 Voltage (High) Cable Operably Coupled to Second Electrode
  149 Second Electrode (an electrode that is operatively coupled to the printer head and moves with the printer head; e.g., a movable copper tape electrode)
  150 Third Electrode (an electrode that is operatively coupled to a baseline layer of a printing filament, printing material, or printing product; e.g., a fixed copper tape electrode)
  151 Current (Out) Cable Operatively Coupled to Third Electrode
  152 Voltage (Low) Cable Operatively Coupled to Fourth Electrode
  154 Fourth Electrode (an electrode that is operatively coupled to a baseline layer of a printing filament, printing material, or printing product; e.g., a fixed copper tape electrode)
  155 Conductive Paste (e.g., conductive silver paste; not shown for example as the paste or glue is disposed in a space between electrode and printer head and between electrode and baseline layer of printing filament)
  157 Baseline layer of the printing filament, printing material or printing product
  160 Printing filament, printing material, or printing product
  165 Printing Path
  170 Peak As used herein, the term "real-time electrical signature" refers to the real-time measured impedance, resistance, or capacitance curves as a function of printing time, printing path or printing location.

As used herein, the term "peak" refers to local maxima of impedance, resistance, or capacitance measured in impedance, resistance, or capacitance versus printing time curves or impedance, resistance, or capacitance versus printing location curves.

As used herein, the term "peak height" refers to the maximum impedance, resistance, or capacitance measurement of a peak.

As used herein, the term "peak shape" refers to the appearance of the peak. Examples of peak shape may include, but are not limited to, the pattern of the peak, the width of the peak, the height of the peak, the increasing and decreasing slopes of the peak, the symmetry of the peak, the sharpness of the peak, peak splitting, the presence of shoulders, etc.

As used herein, the term "peak smoothness" refers to the jaggedness of the line of the peak or the baseline of the measured impedance, resistance, or capacitance.

As used herein, the term "perfect printing" refers to a plurality of peaks with little or no variations in pattern, width, height, shape, or smoothness compared to the reference peaks or the reference fingerprint.

As used herein, the term "essential information" refers to information pertaining to the printing quality such as the presence of imperfections in the printing material, the type of imperfections, the location of imperfections in the printing material, the material strength and moisture level, etc.

Figure 1A:
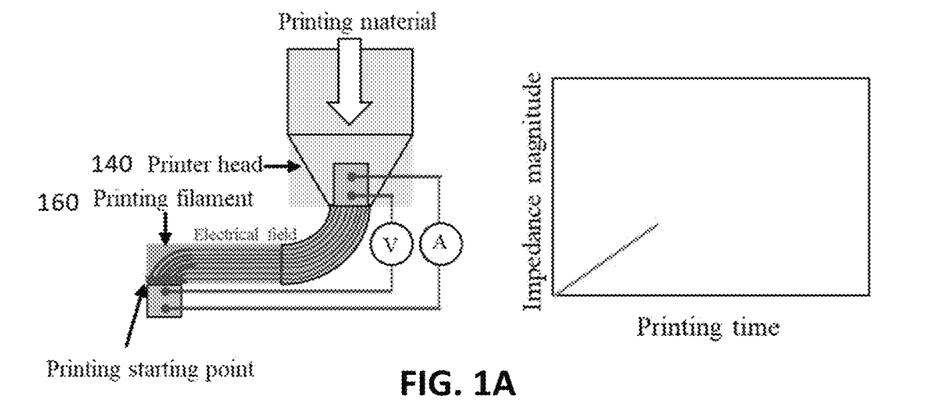
FIG. 1A, FIG. 1B, and FIG. 1C illustrates the basic concept of electrical impedance-based quality monitoring approach during concrete 3D printing/additive manufacturing. A non-limiting example of a printing filament (160) is indicated in the schematic of FIG. 1A.
Figure 1B:
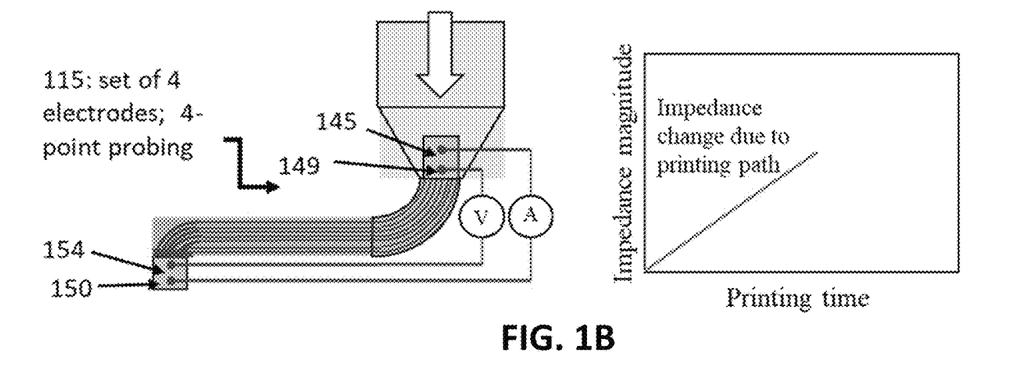
Figure 1C:
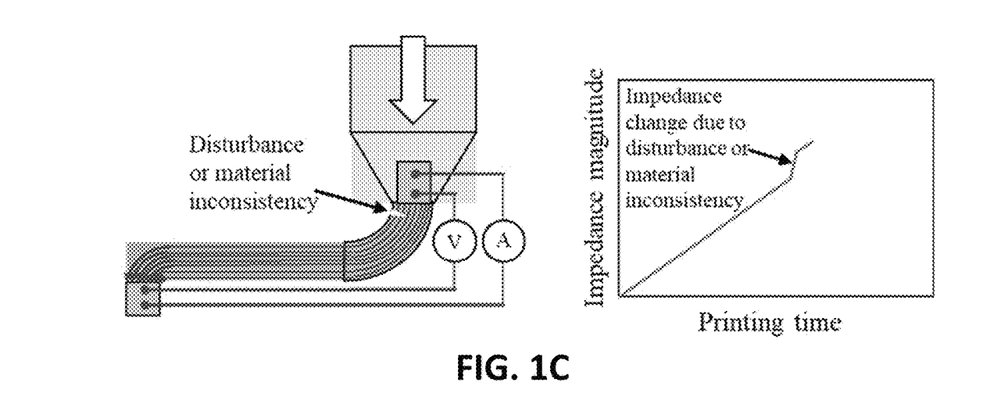

Referring now to FIGS. 1A-1C, the present invention features systems and methods that allow for real-time and automated monitoring, measurement and control of 3D printed concrete quality during the AM process.

The present invention features an electrical impedance, resistance, or capacitance four-point probing system integrated with a three-dimensional (3D) printer for automated printing and automated in situ quality monitoring and control of an AM process, including a 3D printing process, of materials. In preferred embodiments, the four-point probing system comprises: 1) a set of four electrodes; 2) an impedance analyzer operatively coupled to the four electrodes; 3) an automated movable printer head operatively coupled to i) two of the four electrodes (to allow movement of two electrodes with the automated movable printer head) and ii) a material reservoir or pump that is operatively coupled to the 3D printer; 4) a baseline printing filament, baseline printing material or a baseline printing product operatively coupled to the other two of the four electrodes (to allow the electrodes to be fixed along the baseline printing filament, material or product); and 5) a controlling terminal comprising a computer interface, software, and display monitor to control the AM or 3D printing process and display the monitoring data and results of the AM or 3D printing process.

The present invention further features a system for automated printing and automated in situ quality monitoring and control of an AM process, including a 3D printing process, of materials. This system is an electrical impedance, resistance, or capacitance four-point probing system integrated with a three-dimensional (3D) printer. In preferred embodiments, the system comprises: 1) a set of four electrodes (115) each operatively coupled to a cable; 2) an impedance analyzer (120) operatively coupled to the set of four electrodes (115) through each of the four cables; 3) a reservoir (130) containing a printing material that is pumped or extruded to an automated movable printer head (140); 4) an automated movable printer (140) head operatively coupled to the reservoir (130) to receive the printing material from the reservoir, and the printer head (140) is also operatively coupled to two of the electrodes; and 5) a controlling terminal (110) operatively coupled to the printer head (140) and impedance analyzer (120).

In some embodiments, the set of four electrodes (115) comprises a first electrode (145), a second electrode (149), a third electrode (150), and a fourth electrode (154) each operatively coupled to a cable for four-point probing of electrical impedance, resistance, or capacitance. For example, four-point probing determines in situ complex impedance (including real and imaginary parts), resistance, or capacitance in real time concurrently with the AM process, including a 3D printing process.

In other embodiments, the impedance analyzer (120) is operatively coupled to the set of four electrodes (115) through each of the four cables (e.g., a first cable (146), a second cable (147), a third cable (151), and a fourth cable (152)) for electrical current injection, voltage measurement, and impedance, resistance or capacitance measurement. A non-limiting example comprises that the first electrode (145) is operatively coupled to a first cable (146) allowing current in and the and the third electrode (150) is operatively coupled to a third cable (151) allowing current (alternating current (AC) or direct current (DC)) out and into a printing filament, printing material, or printing product (160) at a certain frequency or a range of frequencies. Also, the second electrode (149) is operatively coupled to a second cable (147) for high voltage and the fourth electrode (154) is operatively coupled to a fourth cable (152) for low voltage allowing in situ voltage measurement within the printing filament, printing material, or printing product (160). In preferred embodiments, the impedance analyzer provides real-time, in situ measurement and analysis of complex impedance, resistance, or capacitance.

In one embodiment, the automated movable printer (140) head is operatively coupled to the reservoir (130) to receive the printing material from the reservoir. In this configuration, the printer head is operatively coupled to a 3D printer. In further embodiments, the 3D printer comprises a robotic arm or a gantry printer (125) that moves the printer head (140). The printer head deposits a printing filament, printing material, or printing product (160) comprising a baseline printing filament, printing material, or printing product (157) along a printing path (165). The first and second electrodes are attached to the printer head through a conductive paste (155) (e.g., conductive silver paste or adhesive, thin film; material that closes the gap between the electrode and the substrate providing a highly conductive interface), allowing automated movement of the two electrodes along with the printer head (140) at the same time as the printing filament, printing material, printing product (160) is being deposited along the printing path (165). The baseline printing filament, baseline printing material, or baseline printing product (157) is operatively coupled to the third electrode and fourth electrode through the conductive paste (155).

In some embodiments, the controlling terminal (110) is operatively coupled to the robotic arm or gantry printer (125) and impedance analyzer (120). The controlling terminal provides a computer interface module or computer software to control the four-point probing system and display monitor to display the impedance (or resistance, or capacitance) and quality measurements.

Figure 4:
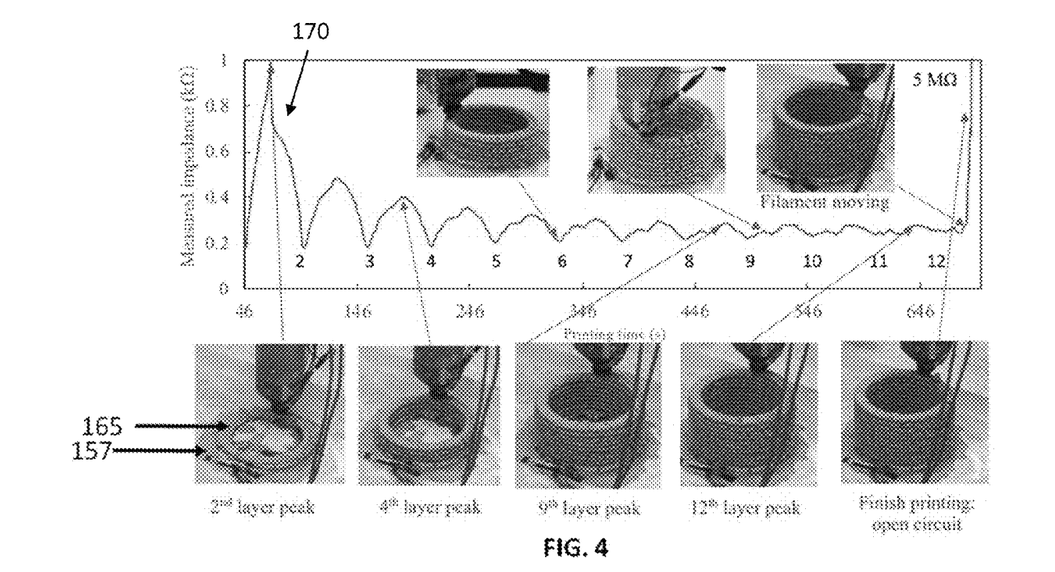
FIG. 4 shows real-time, in situ measurement of impedance vs. printing time of one specimen. The curve and its characteristics contain information on the printing path and quality, occurrence and features of interlayers and imperfections, and mechanical strength development. Non-limiting examples of the printing path (165) and the baseline layer of the printing filament (157) are indicated in FIG. 4.
Figure 5:
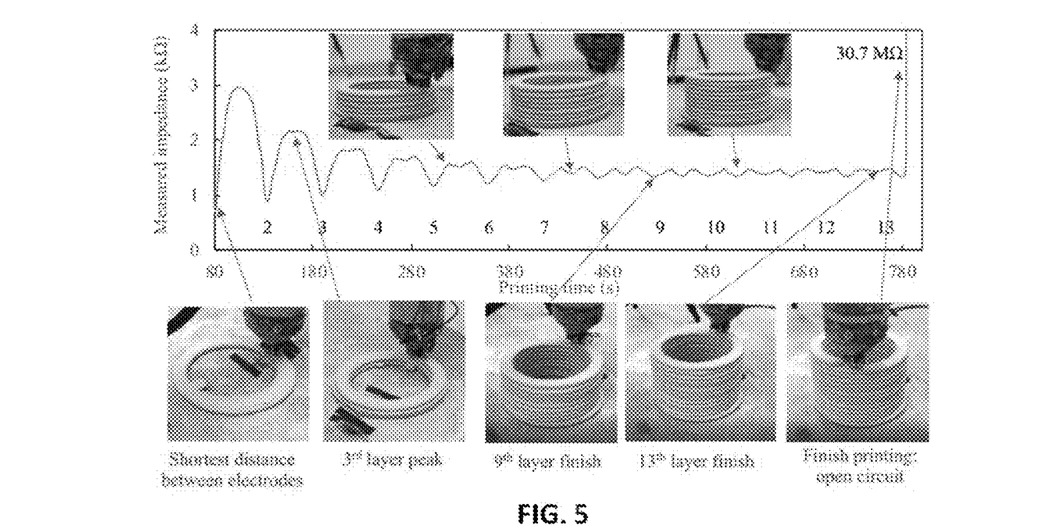
FIG. 5 shows real-time, in situ measurement of impedance vs. printing time of another specimen. The curve and its characteristics contain information on printing path and quality, the occurrence and features of interlayers and imperfections, and mechanical strength development.
Figure 6:
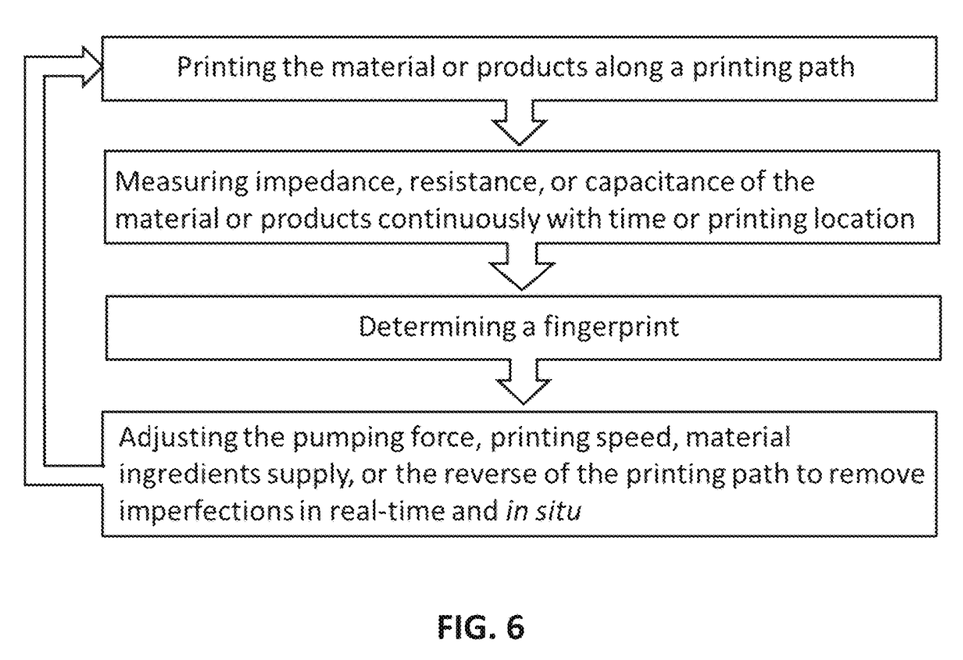
FIG. 6 shows a flow diagram for the method of monitoring and controlling 3D printing quality of material or products using the four-point probing system in the present invention.

In preferred embodiments, the system (100) allows establishing a closed-loop control, measuring the complex impedance in real-time or continuously with time as the printing process proceeds along the printing path providing impedance, resistance, or capacitance versus printing time curves or impedance, resistance, or capacitance versus printing location curves that represent a fingerprint. Referring to FIG. 4 and FIG. 5, the fingerprint is a curve comprising a plurality of peaks having variations in pattern, width, height, shape, or smoothness, and the pattern, width, height, shape, or smoothness of each peak in the plurality of peaks is compared to a reference fingerprint representing perfect printing quality. A comparison of the peaks with the reference fingerprint is performed to determine the quality of the printing material. The comparison of pattern, width, height, shape, and smoothness of the peaks to the reference fingerprint comprises essential information on the printing quality, and locations and properties of imperfections and interlayers. Non-limiting examples of imperfections include material deposition discontinuities, non-homogeneities, flaws, pores, cracks, air gaps, printing interlayers, etc. in the printing filament, printing material, or printing product (160).

In preferred embodiments, the measured electrical signal or printing quality signature or fingerprint are sent back to the controlling terminal of the 3D printer to provide real-time and in situ adjustment of the printing process and parameters. Adjustment of the printing process and parameters may include, but is not limited to, adjusting the pumping force, printing speed, material ingredients supply, repair, or the reverse of the printing path to remove imperfections, in order to control and assure quality of the 3D printing filament, printing material, or printing product.

In other embodiments, the four-point probing system is configured to allow a two-point probing integrated 3D printing system, wherein the first and second electrodes are combined into a first single electrode and the third and fourth electrodes are combined into a second single electrode, wherein the first single electrode is operatively coupled to both the first cable (146) and second cable (147) and the second single electrode is operatively coupled to both the third cable (151) and fourth cable (152). In some embodiments, the frequency comprises a constant frequency or a range of different AC frequencies comprising 0.01 to $10^7$ Hz. In other embodiments, direct current (DC) is used instead of AC.

Non-limiting examples of the material that can be printed using the system of the present invention comprise concrete-, cement-, ceramic-, clay-based material, or any material that has similar electrical behavior to cementitious material. Therefore, the printing filament comprises concrete-, cement-, ceramic-, clay-based material, or any material that has similar electrical behavior to cementitious material.

In preferred embodiments, the system comprises a controlling terminal electrically connected to the impedance analyzer and electrically or wirelessly connected to the 3D printer. The controlling terminal provides a computer interface module or software to collect data, to analyze data, and to control the system of the present invention (e.g. control frequency, provide current input, frequencies, voltage, impedance measurement and analysis, ingredient supply, printing path, speed and rate of material deposition, pumping force, printing speed) and display monitor to display the impedance and quality measurements and fingerprint curves.

In some embodiments, the system further comprises a camera (105) to provide a visual record or account of the entire process and four-point probing system. The camera can be independent (i.e., not directly connected to the system) or directly attached to the system. In other embodiments, the complex impedance comprises real impedance values, imaginary impedance values, impedance magnitude, phase angle, resistance, and capacitance at fixed or a range of frequencies comprising 0.01 to $10^7$ Hz.

In preferred embodiments, the integrated 3D printer further comprises a material reservoir or pump connected to the printer head to allow additive manufacturing of the material. This reservoir or pump can be connected to a robotic arm or printing gantry system. In some embodiments, the robotic arm or gantry system can be any instrument suitable for automated movement of a reservoir or the nozzle of the pump containing concrete-, cementitious-, ceramic-, or clay-based material.

In some embodiments, the baseline printing filament, printing material, or printing product with the affixed two electrodes can be adjusted throughout the 3D printing or AM process. A non-limiting example comprises that the baseline filament with affixed electrodes can be moved to an upper level, from the baseline layer to a second, third, fourth, fifth, sixth, seventh, eighth, ninth, tenth layer or a higher layer as needed.

In preferred embodiments, the conductive paste comprises conductive silver paste. In other embodiments, the paste can be any adhesive and conductive material that operatively couples together at least two surfaces and minimizes contact impedance.

In some embodiments, the impedance analyzer comprises any electrical measurement instrument that measures impedance, resistance, or capacitance, Non-limiting examples of the measured complex impedance comprise real part, imaginary part, impedance magnitude, and phase angle.

The present invention also features a system for simultaneously printing a three-dimensional (3D) cementitious material while conducting impedance-based monitoring of the cementitious material printing. In preferred embodiments, the system comprises: 1) a set of four electrodes for four-point probing of impedance (or resistance, or capacitance) measurement to monitor printing quality; 2) a closed-loop control that feed the electrical signal to the controller to adjust printing-process in real time to control printing quality; 3) a material reservoir containing the cementitious material; 4) an automated movable printer head, disposed on end of the material reservoir to receive the material from the reservoir and to deposit the printing filament along a printing path, and to move the electrodes; 5) a robotic arm or gantry printer to automatically move the printer head; 6) a baseline layer of the printing filament; 7) a conductive silver paste; 8) an impedance analyzer; 9) cables for current injection, voltage measurement or data collection, which can be replaced by wireless sensors; 10) a controlling terminal; and 11) a camera.

In preferred embodiments, the first and second electrodes (of the 4 electrodes used for four-point probing) are movable conductive copper tapes or wires that are attached to the printer head through conductive silver paste, allowing automated movement of the first and second electrodes along the printing path at the same time as the cementitious/concrete filament is being deposited. Additionally, and just as important, the third and fourth electrodes are fixed (or movable) conductive copper tapes or wires attached to a baseline layer of the printing filament, through conductive silver paste. In preferred embodiments, the first electrode allows current in, the third electrode allows current out, and the second and fourth electrodes allow voltage measurement. This configuration provides in situ measurement of voltage and impedance (or resistance, or capacitance) within the printing filaments.

In preferred embodiments, an alternating current (AC) into the printing filament is at a certain frequency or range of frequencies. A non-limiting example of the range of AC frequencies is 0.01 to $10^7$ Hz.

Advantageously, the system of the present invention provides a four-point probing system integrated into the 3D printing process to determine in-situ complex impedance (including real and imaginary parts) of the printed material or products at a specific time, providing a real-time, in situ measurement. In preferred embodiments, the conductive silver paste provides close contact of the movable and fixed conductive copper tapes with the printing filament to minimize contact impedance.

In preferred embodiments, the impedance analyzer is connected to the movable and fixed electrodes through cables so that the impedance analyzer can provide real-time, in situ measurement and analysis of complex impedance. The controlling terminal is electrically connected to the impedance analyzer. The controlling terminal is also wirelessly (or electrically) connected to the printer (or robotic arm). The controlling terminal provides a computer interface module or software to collect and analyze the data and impedance measurements and to control the system (e.g., to control the current input and frequency, data collection intervals, printing extrusion force and flow rate of material or printing filament being deposited, printing path and speed), and a display monitor to display the impedance and quality measurements. The camera can be independent of the system (connected to or not connected to the system) and provides a visual record or account of the process.

In preferred embodiments, the printing process proceeds depositing the cementitious material along the printing path, the complex impedance is measured/monitored continuously with time, providing impedance vs. time and impedance vs. printing location curves that represent a fingerprint comprising essential information on the printing quality, and locations and properties of imperfections and interlayers, wherein the fingerprint provides real-time detection of location and severity of imperfections and enables monitoring and quantifying concrete quality and strength development during printing.

In select embodiments, the material may comprise concrete- ceramic-, clay-based material, or any material that has similar electrical behavior to cementitious material. Accordingly, the printing filament comprises a concrete-, ceramic-, or clay-based material, or any material that has similar electrical behavior to cementitious material.

The present invention further features an integrated method of 3D printing and monitoring and controlling 3D printing quality of material using the systems described herein. The method allows a printing process that deposits material (e.g., concrete-, cementitious-, ceramic-, or clay-based material) along a printing path, while simultaneously monitoring printing quality along with the printing process. The 3D printing monitoring uses the complex impedance, resistance, or capacitance that is measured/monitored continuously with time afforded by the closed-loop four-point (or two-point) probing system described herein. The four-point probing system provides real-time impedance, resistance, or capacitance versus printing time and impedance, resistance, or capacitance versus printing location curves that represent a fingerprint comprising essential information on the printing quality, material strength development, and locations and properties of imperfections and interlayers of the printed material. A specific frequency or various frequency ranges can also be used (e.g., 0.01-$10^7$ Hz). The four-point probing system provides an impedance vs. time and impedance vs printing location curves that represent a fingerprint comprising essential information on the printing quality, and locations and properties of imperfections and interlayers.

In some embodiments, the present invention features a method of monitoring and controlling the 3D printing quality of material or products using the system of the present invention. The method comprises printing the material or products along a printing path, measuring impedance, resistance, or capacitance of the material or products continuously with printing time or printing location during the 3D printing process, determining a fingerprint using the measured impedance, resistance, or capacitance of the material or products, and adjusting the pumping force, printing speed, material ingredients supply, or the reverse of the printing path to remove imperfections in real-time and in situ, in order to control and assure quality of the 3D printing concrete product. In one embodiment, the measured impedance, resistance, or capacitance is sent back to the controlling terminal in order to determine the fingerprint and adjust the printing process. In other embodiments, the fingerprint comprises i) a real-time impedance, resistance, or capacitance versus printing time curve, and ii) the real-time impedance, resistance, or capacitance versus printing location curve, and the fingerprint comprises essential information on the printing quality, material strength development, and locations and properties of imperfections and interlayers of the printed material.

Importantly, the method of the present invention features a fingerprint of electrical properties versus manufacturing process of a material produced by AM or 3D printing. This fingerprint or electrical response signature of the printed material or product comprises the real-time measured impedance, resistance or capacitance curves as a function of printing time, printing path and printing location providing necessary information on the printing quality change with time and along the printing path allowing the real-time detection of location and severity of imperfections, and concrete strength development. The fingerprint comprises a plurality of peaks having variations in pattern, width, height, shape, or smoothness, and the pattern, width, height, shape, or smoothness of each peak in the plurality of peaks is compared to a reference fingerprint. The reference fingerprint represents perfect printing quality, and the comparison of pattern, width, height, shape, or smoothness of the fingerprint to the reference fingerprint comprises essential information on the printing quality, and locations and properties of imperfections and interlayers. The fingerprint enables monitoring and controlling printing quality during printing.

In further embodiments, the present invention features a method of determining a fingerprint of a 3D printing material using the movable four-point probing system integrated with a 3D printer. The method comprises printing the 3D printing material, measuring the impedance, resistance, or capacitance of the 3D printing material continuously with printing time or printing location, and determining a fingerprint using the measured impedance, resistance, or capacitance of the 3D printing material. The measured impedance, resistance, or capacitance is sent back to the controlling terminal, and the fingerprint comprises i) a real-time impedance, resistance, or capacitance versus printing time curve, and ii) the real-time impedance, resistance, or capacitance versus printing location curve. In further embodiments, essential information on the printing quality, material strength development, and locations and properties of imperfections and interlayers of the printed material is determined from the fingerprint.

In preferred embodiments, the method of the present invention allows closed-loop control to assure the printing quality through real-time adjustment and corrections of the printing parameters such as pumping speed and force, material ingredient supply and flow, and printing path.

In some embodiments, the method and the fingerprint of the present Invention can be used for different 3D concrete printing geometries and printing parameters.

In other embodiments, the method and the fingerprint of the present invention can be used in the additive manufacturing industry, construction industry, concrete repair industry, wind energy industry (e.g. for building tall wind turbine towers or offshore structures), building sectors, architectural companies, 3D printing industry, robotic industry (e.g. as an addition or modification feature to current robotics designs to add a real-time monitoring capacity), 3D concrete printer and gantry printer manufacturers and companies (e.g. as an integrated feature into the printers), U.S. Department of Energy, U.S. Army Construction and Engineering (a leader in concrete 3D printing), federal and state departments of transportation, and NASA.

The present invention is suitable for concrete-, cement-, ceramic-, or clay-based material or any material that has similar electrical behavior to cementitious material.

In preferred embodiments, the fingerprint provides real-time and in situ adjustment of the pumping force, printing speed, material ingredients supply, or the reverse of the printing path to remove imperfections, in order to control and assure quality of the 3D printing concrete structural product.

In appropriate circumstances, the method and fingerprint of the present invention can be used to perform quality control and assurance for creating structures, sculptures, arts, architecture, and pottery using 3D printing technology.

EXAMPLES

The following are non-limiting examples of the present invention. It is to be understood that said example is not intended to limit the present invention in any way. Equivalents or substitutes are within the scope of the present invention.

Example 1 Concept of Electrical Impedance-based Quality Monitoring Approach During Concrete 3D Printing/Additive Manufacturing 3D concrete printing is a layer-by-layer extrusion process. This method innovatively engages the printing material and product being additively manufactured as self-sensors to monitor its printing quality. Impedance measurement is conducted through four-point (or two-point) probing along with the printing process. FIG. 1A shows the four-point probing system and the associated impedance magnitude vs. printing time curve. FIG. 1B shows the four-point probing system (115) during printing and the impedance change due to the advancement of the printing path without a disturbance or material inconsistency. FIG. 1C shows the four-point probing system with a disturbance, imperfection or material inconsistency and the associated impedance change due to the disturbance, imperfection (e.g. flaws, voids, cracks) or material inconsistency.

Example 2: Prototype System

Figure 2A:
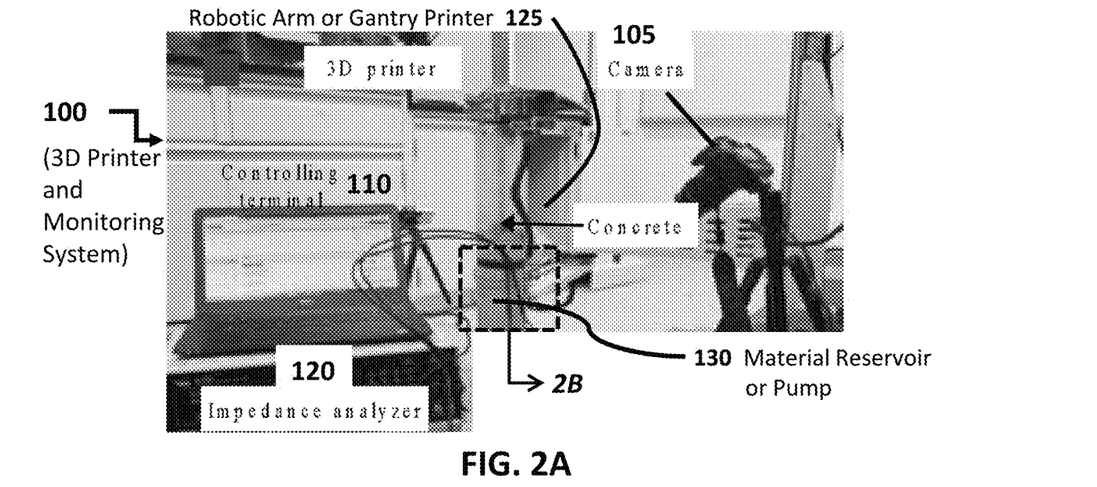
FIG. 2A, FIG. 2B, and FIG. 2C show a prototype laboratory assembly of the present invention.
Figure 2B:
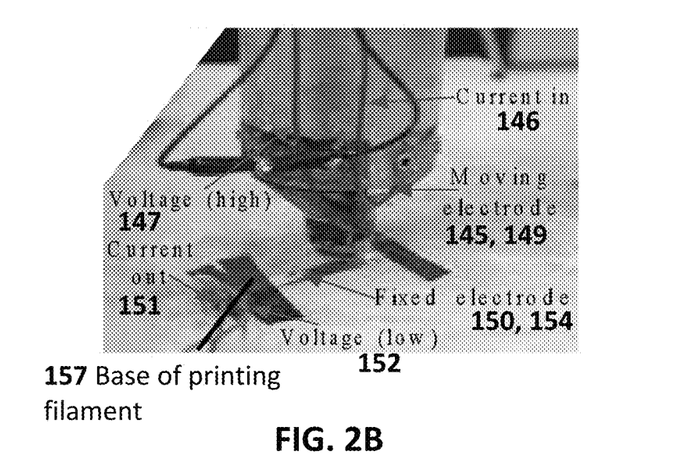
Figure 2C:
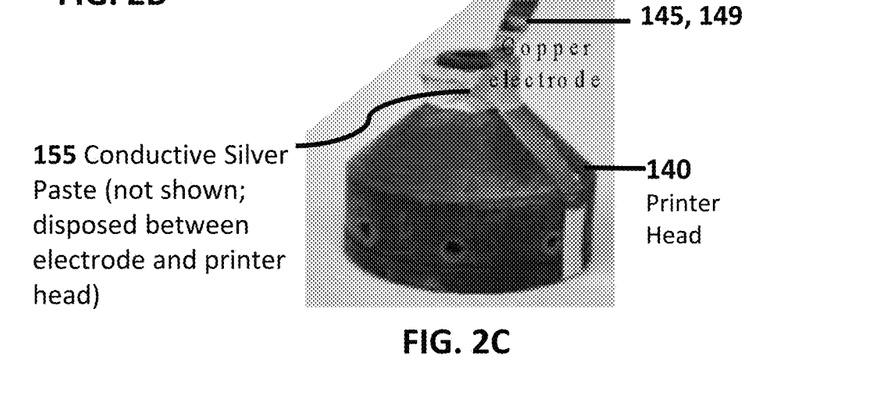

FIGS. 2A-2C shows a prototype system (100) of the present invention. The controlling terminal (110), impedance analyzer (120), material reservoir or pump (130), and optional camera (105) are shown in FIG. 2A. Two electrodes (145, 149) are installed on the printer head (140), while the other two electrodes (150, 154) are installed on the baseline layer of the printing filament (157) (FIG. 1B and FIG. 2B). The current in cable (146), the current out cable (151), the high voltage cable (147), and the low voltage cable (151) are shown in FIG. 2B). The electrodes can be made of conductive copper tape and are closely in contact with the printing filament through conductive silver paste (155) (not visually shown) to minimize contact impedance (FIG. 2C). During the printing process, the two electrodes installed on the printer head will automatically move along the printing path at the same time as the concrete filament is being deposited, thus providing real-time, in situ measurement. The two outer electrodes inject AC current into the printing concrete filament either at a certain frequency or at a range of different frequencies (e.g. 0.01 to $10^7$ Hz). The two inner electrodes measure the in-situ voltage within the printing filaments, which is used to determine the in-situ complex impedance (including real and imaginary parts, impedance magnitude, and phase angle) at the specific time and printing location. As the printing process proceeds along the printing paths, the complex impedance is measured continuously with time, providing an impedance vs. time (or impedance vs. printing location) curve that represents a fingerprint containing essential information on the printing quality, and locations and properties of imperfections and interlayers (as shown in FIG. 4 and FIG. 5).

Example 3: Non-limiting Embodiments of Four 3D Printed Concrete Structural Components (e.g., Four Specimens)

Figure 3A:
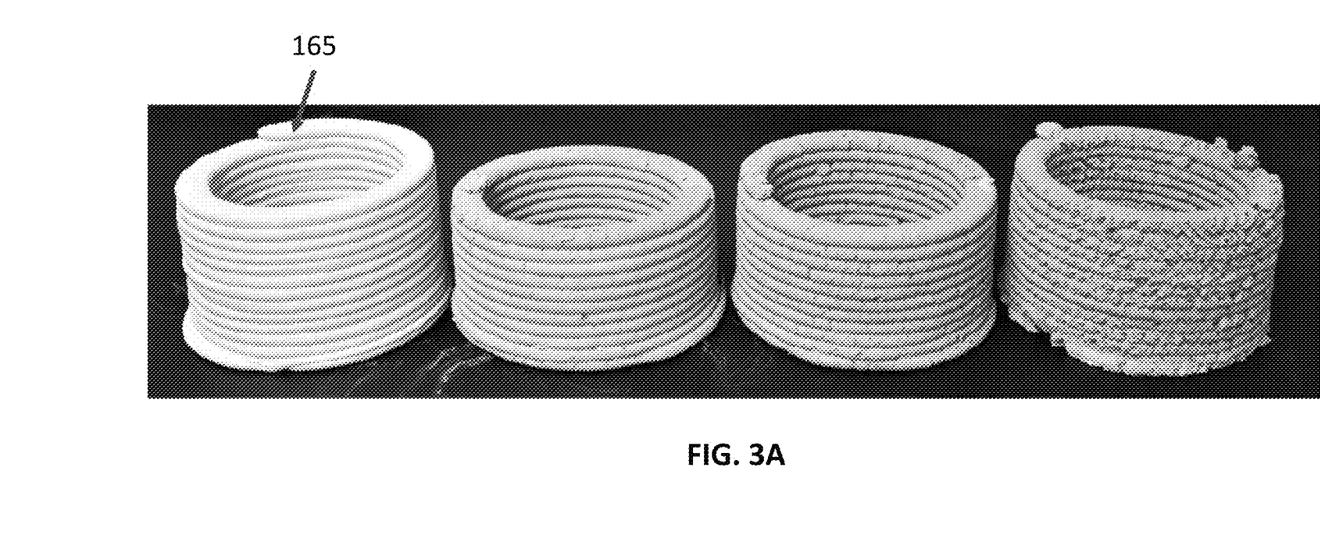
FIG. 3A and FIG. 3B show two displays of four specimens of 3D printed concrete structural components with varying quality from good (left) to poor (right), with increasing imperfections. During printing, printing quality was continuously monitored using the invented method (as shown in FIG. 4 and FIG. 5). A non-limiting example of a printing path (165) for one of the specimens is shown in FIG. 3A.
Figure 3B:
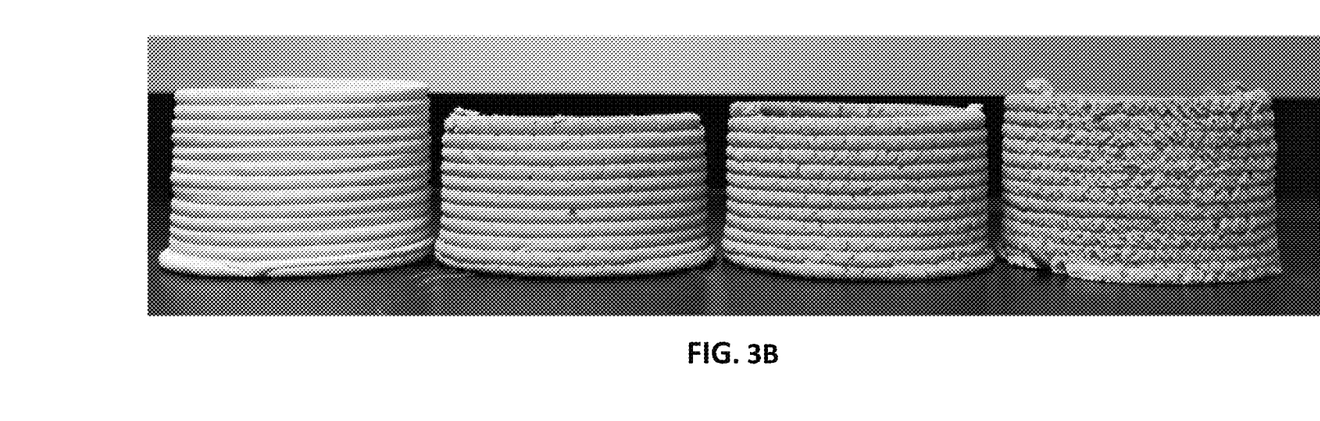

FIG. 3A and FIG. 3B show four non-limiting embodiments of the present invention. The 3D printed concrete structural components are shown with varying quality from good (left) to poor (right). The printing quality decreases from left to right, with increasing imperfections. During printing, their printing quality was continuously monitored using the method described herein.

Example 4: Non-limiting Embodiments of Fingerprints Associated with the Four 3D Printed Concrete Structural Components (e.g., Four Specimens)

FIG. 4 and FIG. 5 show the fingerprints for two of the four specimens shown in FIG. 3A and FIG. 3B and demonstrate the real-time, in situ monitoring of 3D printing concrete quality through the measured impedance vs. printing time (or location) curves. This fingerprint curve and its detailed characteristics contain the essential and necessary information on the printing quality, occurrence location and time, as well as key features of the interlayers and imperfections. The fingerprint data can also be used for closed-loop control to offer real-time, in situ quality control and assurance for concrete 3D printing/additive manufacturing.

In summary, there is no current real-time quality control and monitoring method available for the additive manufacturing of concrete-, cement-, ceramics- or clay-based materials. Compared with visual inspection, the present invention allows for more accurate, quantitative rather than subjective, real-time, in situ monitoring and offers spatial resolution of concrete quality, imperfections, and strength development at every location along the printing path. In addition, this automated process is much less labor-intensive and cheaper than visual inspection. It is also low-cost because this method does not require installation of expensive sensors; rather, it engages the 3D printing concrete material being additively manufactured to behave as a sensing media (or a self-sensing material) and only uses highly cheap electrodes (not sensors) for injecting AC current and collecting real-time impedance data. Furthermore, the invention allows closed-loop control: the real-time monitored electrical data can be fed into the controller system of the printing equipment (e.g., 3D printer, robotic arm or gantry printer) to adjust the printing speed and path, material ingredients supply and flow during in situ manufacturing for improving and controlling the quality of the 3D printed products. This quality control and assurance method will lead to higher quality, more reliable concrete products with safer, stronger, and more durable performance and less initial costs as well as lifecycle costs.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. An electrical impedance, resistance, or capacitance four-point probing system integrated with a three-dimensional (3D) printer (100) for automated printing and automated in situ quality monitoring and control of an Additive Manufacturing (AM) process, including a 3D printing process, of materials, the system comprising:
   a. a set of four electrodes (115) comprising a first electrode (145), a second electrode (149), a third electrode (150), and a fourth electrode (154) for four-point probing of electrical impedance, resistance, or capacitance, wherein four-point probing determines in situ complex impedance, resistance, or capacitance in real time concurrently with the AM process, including the 3D printing process;
   b. an impedance analyzer (120) operatively coupled to the set of four electrodes (115) through a first cable (146), a second cable (147), a third cable (151), and a fourth cable (152) for electrical current (or voltage) injection, voltage (or current) measurement, and impedance, resistance or capacitance measurement,
      wherein the first electrode (145) is operatively coupled to a first cable (146) that allows current in, and the third electrode (150) is operatively coupled to a third cable (151) that allows current out, wherein the first cable (146) provides alternating current (AC) or direct current (DC) into a printing filament, printing material, or printing product (160) at a certain frequency or a range of frequencies, and wherein the second electrode (149) is operatively coupled to a second cable (147) for high voltage and the fourth electrode (154) is operatively coupled to a fourth cable (152) for low voltage allowing in situ voltage measurement within the printing filament, printing material, or printing product (160);
   c. a reservoir (130) containing a printing material, wherein the printing material is pumped or extruded from the reservoir (130) to an automated movable printer head (140);
   d. the automated movable printer head (140) operatively coupled to the reservoir (130) to receive the printing material from the reservoir (130), wherein the printer head (140) is operatively coupled to the 3D printer; wherein the printer head (140) deposits a printing filament, printing material, or printing product (160) comprising a baseline printing filament, printing material, or printing product (157) along a printing path (165);
      wherein the movable printer head is operatively coupled to the first electrode (145) and second electrode (149) through the conductive paste (155), wherein the first and second electrodes automatically move along with the printer head at the same time as the printing filament, printing material, or printing product (160) is being deposited along the printing path (165), and wherein the baseline printing filament, printing material, or printing product (157) is operatively coupled to the third electrode (150) and fourth electrode (154) through the conductive paste (155); and
   e. a controlling terminal (110) operatively coupled to the 3D printer and impedance analyzer (120), wherein the controlling terminal (110) comprises a computer interface module or a computer software to control printing and monitoring of the printed material and collect impedance data and quality measurements and a display monitor to display the impedance and quality measurements;
   wherein the four-point probing system (100) allows establishing a closed-loop control, wherein the complex impedance is measured in real time or continuously with time as the printing process proceeds along the printing path providing impedance, resistance, or capacitance versus printing time curves or impedance, resistance, or capacitance versus printing location curves that represent a fingerprint, wherein the fingerprint comprises a plurality of peaks having variations in pattern, width, height, shape, or smoothness, wherein the pattern, width, height, shape, or smoothness of each peak (170) in the plurality of peaks is compared to a reference fingerprint, wherein the comparison of pattern, width, height, shape, or smoothness of the fingerprints comprises information on the printing quality, and locations and properties of imperfections and interlayers;
      wherein the fingerprint is sent back to the controlling terminal of the printer to provide real-time and in situ adjustment of the printing process and parameters comprising pumping force, printing speed, material ingredients supply, repair, or the reverse of the printing path to remove imperfections, in order to control and assure quality of the 3D printing filament, printing material, or printing product.

2. The four-point probing system of claim 1, wherein the four-point probing system is configured to allow a two-point probing system integrated with the 3D printer, wherein the first and second electrodes are combined into a first single electrode and the third and fourth electrodes are combined into a second single electrode, wherein the first single electrode is operatively coupled to both the first cable (146) and second cable (147) and the second single electrode is operatively coupled to both the third cable (151) and fourth cable (152).

3. The system of claim 1, wherein the 3D printer comprises a robotic arm or a gantry printer (125) that moves the printer head (140).

4. The system of claim 1, wherein the frequency comprises a constant frequency or a range of different AC frequencies comprising 0.01 to $10^7$ Hz.

5. The system of claim 1, wherein the printing material comprises concrete-, cementitious-, ceramic-, clay-based material, or any material that has similar electrical behavior to cementitious material.

6. The system of claim 1, wherein the computer interface module or computer software controls the integrated 3D printer by providing input current, frequencies, voltage, impedance measurement and analysis, deposition rate of printing filament, printing path, pumping force, printing speed, or ingredients supply.

7. The system of claim 1, wherein the system further comprises a camera (105) to visually record the process, connected to the system.

8. The system of claim 1, wherein the complex impedance comprises real impedance values, imaginary impedance values, impedance magnitude, phase angle, resistance, and capacitance at fixed or a range of frequencies comprising 0.01 to $10^7$ Hz.

9. The system of claim 1, wherein the impedance analyzer comprises any electrical measurement instruments that measure impedance, resistance, or capacitance.

10. The system of claim 1, wherein the electrodes comprise copper tape or any electrically conductive material.

11. The system of claim 1, wherein the baseline printing filament, printing material, or printing product can be adjusted throughout the 3D printing or AM process.

12. The system of claim 1, wherein the conductive paste comprises conductive silver paste or any conductive material that operatively couples together at least two surfaces and minimizes contact impedance.

13. A method of monitoring and controlling 3D printing quality of material or products using the system of claim 1, said method comprising:
 a. printing the material or products along a printing path;
 b. measuring impedance, resistance, or capacitance of the material or products continuously with printing time or printing location during the 3D printing process, wherein the measured impedance, resistance, or capacitance is sent back to the controlling terminal;
 c. determining a fingerprint using the measured impedance, resistance, or capacitance of the material or products, wherein the fingerprint comprises i) a real-time impedance, resistance, or capacitance versus printing time curve, and ii) the real-time impedance, resistance, or capacitance versus printing location curve, wherein information on the printing quality, material strength development, and locations and properties of imperfections and interlayers of the printed material is determined from the fingerprint; and
 d. adjusting the pumping force, printing speed, material ingredients supply, or the reverse of the printing path to remove imperfections in real-time and in situ, in order to control and assure quality of the 3D printing concrete product.

14. The method of claim 13, wherein the material comprises concrete-, cementitious-, ceramic-, or clay-based material, or any material comprising similar electrical behavior to cementitious material.

15. A method of determining a fingerprint of a 3D printing material using the system of claim 1, the method comprising:
 a. printing the 3D printing material;
 b. measuring the impedance, resistance, or capacitance of the 3D printing material continuously with printing time or printing location, wherein the measured impedance, resistance, or capacitance is sent back to the controlling terminal; and
 c. determining a fingerprint using the measured impedance, resistance, or capacitance of the 3D printing material, wherein the fingerprint comprises i) a real-time impedance, resistance, or capacitance versus printing time curve and ii) the real-time impedance, resistance, or capacitance versus printing location curve.

* * * * *